J. H. WOOD.
Wagon for Unloading Coal.
No. 9,368. Reissued Aug. 31, 1880.
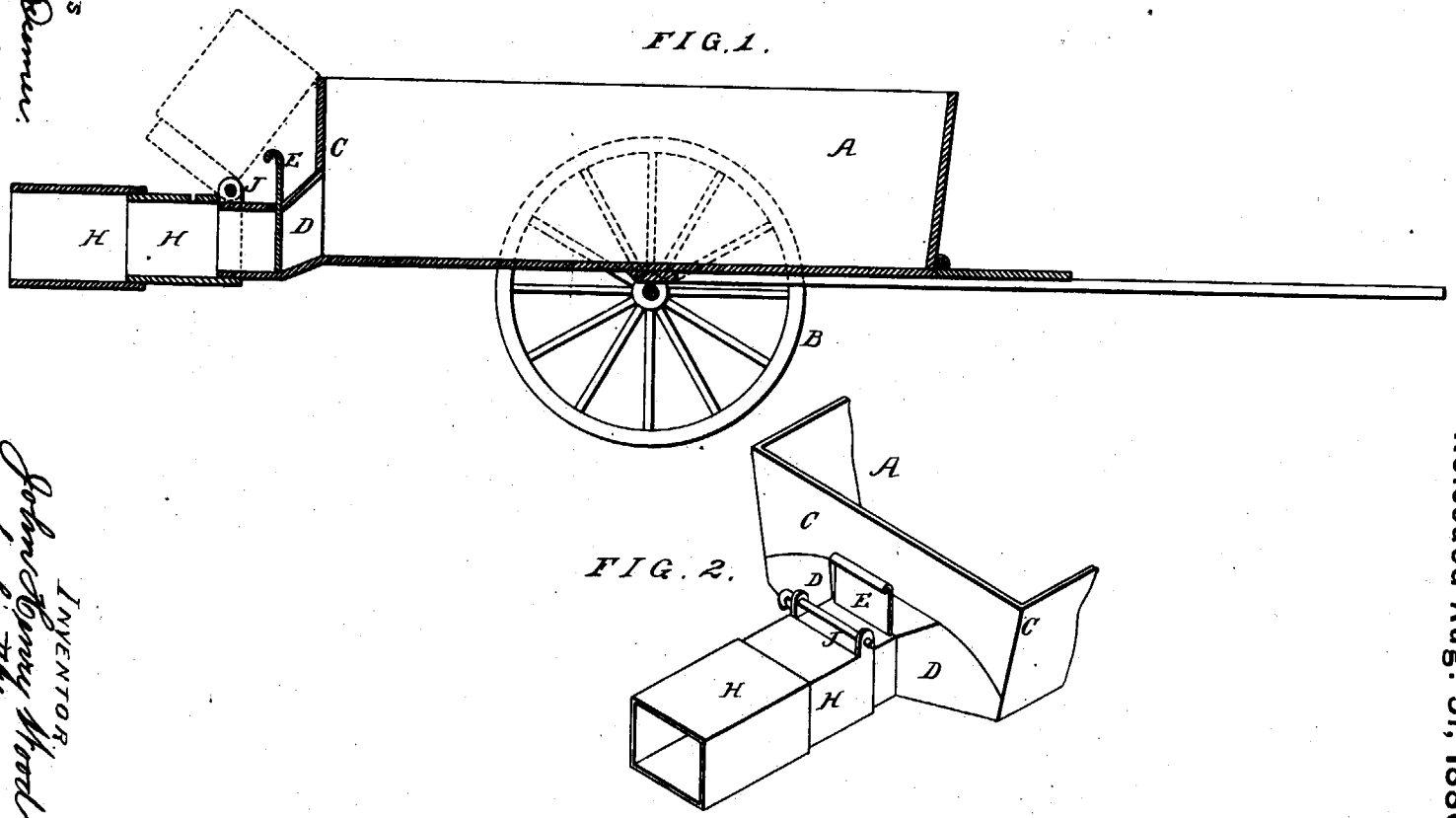
WITNESSES
J. M. Dumer.
Henry Howson Jr.
INVENTOR,
John Henry Wood
by his Attorneys.
Howson and Sons
N. PETERS, PHOTO-LITHOGRAPHER, WASHINGTON, D. C.

UNITED STATES PATENT OFFICE.

JOHN HENRY WOOD, OF TRENTON, NEW JERSEY.

WAGON FOR UNLOADING COAL.

SPECIFICATION forming part of Reissued Letters Patent No. 9,368, dated August 31, 1880.

Original No. 73,684, dated January 21, 1868. Application for reissue filed July 1, 1880.

*To all whom it may concern:*

Be it known that I, JOHN HENRY WOOD, of Trenton, county of Mercer, and State of New Jersey, have invented a new and useful Unloading Attachment for Coal Carts or Wagons; and I do hereby declare the following to be a full, clear, and exact description thereof.

My invention consists of the combination of the body of a coal cart or wagon with an extension-chute, which can be so adjusted as to direct the coal across the pavement to the desired point of discharge, thereby preventing the soiling of the said pavement and obviating the labor incidental to the usual process of shoveling coal into a cellar or vault.

In the accompanying drawings, Figure 1 is a vertical section of a coal-cart with an extension-chute, and Fig. 2 a perspective view of the rear end of the cart and extension-chute.

A represents the body of the cart; B, the wheels of the same, and C the rear end or tail of the cart, having an opening communicating with the funnel-shaped outlet-pipe D, which is secured to and projects from the said tail of the cart, and which is provided with a gate or valve, E.

An extension chute or tube, H, consisting of two or more sections, is adapted to the outlet or may be connected to the same by a hinge or hinges, J. The extension-chute may be square, cylindrical, or trough-shaped, and may be attached by hinges or otherwise to the rear end or side of the cart or wagon, and is for the purpose of directing coal into a cellar-window or into a vault, the chute, which can be adjusted to the point where the load has to be discharged, preventing the dust and dirt from being scattered over the pavement, and obviating the labor involved in the ordinary practice of shoveling the coal into a cellar or vault.

I claim as my invention—

1. The combination of the body of a coal-cart with a sliding extension-chute, substantially as and for the purpose set forth.

2. The combination of the body of a coal-cart and the outlet having a gate or valve with a sliding extension-chute adapted to the said outlet, substantially as specified.

In testimony whereof I have signed my name to this specification in the presence of two subscribing witnesses.

JOHN HENRY WOOD.

Witnesses:

WILLIAM PASHLEY,

HENRY D. SCUDDER.